Patented July 24, 1934

1,967,372

UNITED STATES PATENT OFFICE 1,967,372

ORGANIC MERCURY COMPOUNDS AS NEW DISINFECTANTS

Fritz Schönhöfer, Elberfeld, and Wilhelm Bonrath, Leverkusen-on-the-Rhine, Germany, assignors to Winthrop Chemical Company, Inc., New York, N. Y., a corporation of New York No Drawing. Application March 31, 1930, Serial No. 440,647. In Germany April 6, 1929

10 Claims. (Cl. 167—19)

This invention relates to new disinfectants consisting of organic mercury compounds, which are highly efficacious against plant pests and micro organisms, such as bacteria, moulds and the like, with the result that they can likewise be employed for all purposes of preserving or disinfecting, for example, the immunizing of grain or the like, the preservation of wood, the prevention of mildew formation, in the preservation of glue and the like.

The new disinfectants to be incorporated with the material which is liable to attack by micro organisms correspond to the general formula:

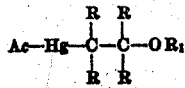

in which "Ac" signifies hydroxyl or any salt-forming group including complex salts with mercury, for example, chlorine, bromine, iodine, thiocyanogen, ferricyanogen, the residue of acetic acid, lactic acid, oxalic acid, sulfuric acid and the like, "R" signifies hydrogen, alkyl, aralkyl or aryl—and several R's may have the same signification—and R₁ alkyl, aralkyl, aryl or the residue

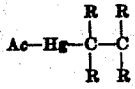

"Ac" and "R" meaning the same as outlined above.

As addition to the above compound an appropriate diluent, filling, absorption or wetting agent or another substance exerting a fungicidal effect in either a wet or dry process may be employed, the compounds in question being thus usually employed in the the form of dispersions thereof.

Tests have shown, that the compound

for example, prevents germination of stone blight spores at a concentration, much below that, which would endanger the seed grain. This effect is of great importance since mercury compounds of the type

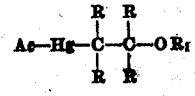

are technically very readily and cheaply accessible (compare Berichte der deutschen Chemischen Gesellschaft, vol. 46, page 2864 et seq), According to the specific material to be disinfected the organic mercury compounds are applied in the variest manner, as can be seen from the examples. The quantities to be added of the disinfectants may vary in wide ranges; on carrying out our new invention every one skilled in the art will find a suitable concentration.

The invention is further illustrated by the following examples:—

*Example 1.*—An aqueous solution of the compound $CH_3-COO-Hg-CH_2-CH_2-OCH_3$ (melting at 42° C., prepared according to Berichte der deutschen chemischen Gesellschaft vol. 46, page 2867) is used for moistening seed grain or the latter is dipped in the solution according to the known procedure.

*Example 2.*—1.5 parts by weight of

(melting at 92° C., prepared according to Berichte der deutschen chemischen Gesellschaft vol. 46, page 2869) are thoroughly incorporated with 98.5 parts by weight of talc and dusted on to 50,000 parts by weight of infected seed grain. The germination of, for example, stone blight spores is hereby completely prevented.

Instead of the chlorides, other salts such as, for example, an acetate, sulfate, nitrate, bromide, thiocyanate, ferricyanate, phosphate, lactate, oxalate and the like can be used. In the above manner, for example, by the addition of dextrine, colloidal solutions can be produced with similar good results. The talc can be replaced by other filling agents or also wholly or partly by wetting or absorption agents. Furthermore, other appropriate fungicidal materials can be added.

*Example 3.*—Chloro mercury ethylene phenol ether of the formula:

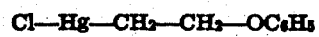

can be used in a similar manner as described in Example 2.

*Example 4.*—Untreated rye infected to the extent of 19% by fusarium is dusted in the ratio of 1000 to 2 with an immunizing agent containing 2% of mercury in the form of ethoxyethyl mercury chloride of the formula:

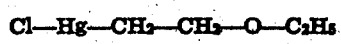

Only 0.3% of infected rye can be detected.

*Example 5.*—Untreated oats infected by winged blight to the extent of 14% is dusted in the ratio of 1000 to 4 with an immunizing agent containing 2% of mercury in the form of ethoxyethylmercurychloride. Only 0.7% of infected oats can be detected.

*Example 6.*—Barley infected by stripe disease is dusted in a ratio of 1000 to 3 with a mixture of an immunizing agent containing 2% of mercury in the form of ethoxyethylmercurychloride and talcum. No infected barley can be detected. Contrary thereto the untreated seed grain is 23% infected.

*Example 7.*—Wheat infected by smut spores is dusted in the ratio of 1000 to 2 with a mixture containing 2% of mercury in the form of methoxyethylmercurychloride and talcum. No infected wheat can be detected while the untreated wheat is 23.5% infected.

In the same manner this immunizing agent is efficacious against fusarium, stripe disease of barley and the winged blight of oats.

*Example 8.*—Barley infected by the stripe disease is dusted in the ratio of 1000 to 3 with an immunizing agent containing 2% of mercury in the form of phenoxyethylmercurychloride. Only 1.1% of infected barley can be detected, while the untreated barley is 19.5% infected.

*Example 9.*—Barley infected by the stripe disease is dusted with a mixture containing 1.5% of mercury in the form of benzyloxyethylmercurychloride and talcum. Only 0.3% of infected barley can be detected. Contrary thereto, the untreated seed grain is 23% infected.

*Example 10.*—The winged blight of oats is completely destroyed by using 0.125% of a mixture of 4.5 grams of methoxyethylmercuryoxalate and 95.5 grams of sodium carbonate at a dipping time of 30 minutes. The untreated oats is 18% infected.

*Example 11.*—On dusting the dry powder, consisting of 2% of mercury in the form of methoxymercuryhydroxide and 98% of talcum in the ratio of 2:1000, upon rye infected by fusarium, only 1.2% of infected rye can be detected. The untreated rye is 58% non-infected and 12% infected by fusarium.

We claim:

1. The process for protecting organic materials liable to attack by plant pests and microorganisms which comprises treating the said materials with a dispersion essentially comprising a mercury compound corresponding to the general formula

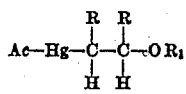

in which "Ac" denotes hydroxyl or any radical of an acid capable of forming a salt with mercury, "R" signifies hydrogen, alkyl, aralkyl or aryl and "R₁" alkyl, aralkyl, aryl or the radical

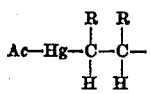

2. The process for protecting organic materials liable to attack by plant pests and microorganisms which comprises treating the said materials with a dispersion essentially comprising a mercury compound corresponding to the general formula

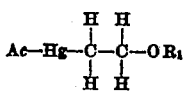

in which "Ac" denotes hydroxyl or any radical of an acid capable of forming a salt with mercury and "R₁" stands for alkyl, aralkyl, aryl or the radical

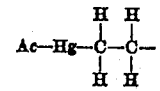

3. The process for protecting organic materials liable to attack by plant pests and microorganisms which comprises treating the said materials with a dispersion essentially comprising a mercury compound corresponding to the general formula

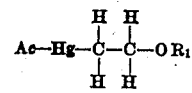

in which "Ac" denotes hydroxyl or any radical of a polybasic, oxygen-bearing acid capable of forming a salt with mercury and "R₁" stands for alkyl, aralkyl, aryl or the radical

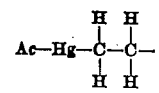

4. The process for protecting organic materials liable to attack by plant pests and microorganisms which comprises treating the said materials with a dispersion essentially comprising a mercury compound corresponding to the general formula

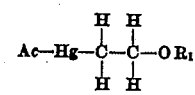

in which "Ac" denotes hydroxyl or any radical of an organic, polybasic acid capable of forming a salt with mercury and "R₁" stands for alkyl, aralkyl, aryl or the radical

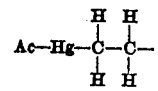

5. The process for protecting organic materials liable to attack by plant pests and microorganisms which comprises treating the said materials with a dispersion essentially comprising a mercury compound corresponding to the general formula

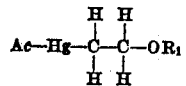

in which "Ac" denotes a radical of oxalic acid and "R₁" stands for alkyl, aralkyl, aryl or the radical

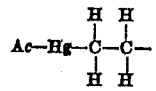

6. The process for protecting organic materials liable to attack by plant pests and microorganisms which comprises treating the said materials with an aqueous solution of an organic mercury compound corresponding to the general formula

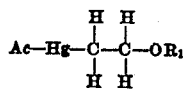

in which "Ac" denotes a radical of oxalic acid and "R₁" stands for alkyl, aralkyl, aryl or the radical

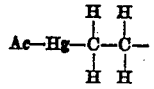

7. The process of immunizing seed grain which comprises treating said seed grain with a dispersion essentially comprising an organic mercury compound corresponding to the general formula

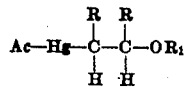

in which "Ac" denotes hydroxyl or any radical of an acid capable of forming a salt with mercury, "R" signifies hydrogen, alkyl, aralkyl or aryl and "$R_1$" alkyl, aralkyl, aryl or the radical

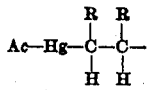

8. The process for immunizing seed grain which comprises treating seed grain with a dispersion of an organic mercury compound corresponding to the general formula

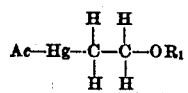

in which "Ac" denotes a radical of a polybasic, oxygen-bearing acid capable of forming a salt with mercury and "$R_1$" stands for alkyl, aralkyl, aryl or the radical

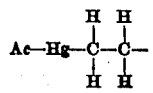

9. The process for immunizing seed grain which comprises treating seed grain with a solution of an organic mercury compound corresponding to the general formula

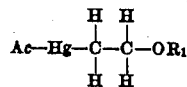

in which "Ac" denotes a radical of oxalic acid and "$R_1$" stands for alkyl, aralkyl, aryl or the radical

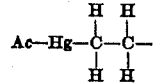

10. The process for immunizing seed grain which comprises treating said seed grain with a dispersion essentially comprising an organic mercury compound corresponding to the general formula

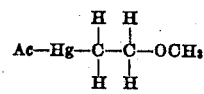

wherein "Ac" stands for the radical of oxalic acid.

FRITZ SCHÖNHÖFER.
WILHELM BONRATH.